(12) United States Patent
Kabra et al.

(10) Patent No.: US 10,387,389 B2
(45) Date of Patent: Aug. 20, 2019

(54) DATA DE-DUPLICATION

(71) Applicant: International Business Machines Corporation, Armonk, NY (US)

(72) Inventors: Namit Kabra, Hyderabad (IN); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 14/501,308

(22) Filed: Sep. 30, 2014

(65) Prior Publication Data
US 2016/0092494 A1    Mar. 31, 2016

(51) Int. Cl.
*G06F 16/23* (2019.01)
*G06F 16/215* (2019.01)

(52) U.S. Cl.
CPC ........ *G06F 16/215* (2019.01); *G06F 16/2365* (2019.01)

(58) Field of Classification Search
CPC ......... G06F 17/30303; G06F 17/30371; G06F 17/0641; G06F 16/215; G06F 16/2356
See application file for complete search history.

(56) References Cited

U.S. PATENT DOCUMENTS

| | | | | |
|---|---|---|---|---|
| 6,044,366 A * | 3/2000 | Graffe | ............ | G06F 17/30592 |
| 6,298,342 B1 * | 10/2001 | Graefe | ............ | G06F 17/30595 |
| | | | | 707/602 |
| 7,072,899 B2 * | 7/2006 | Lokken | ............ | G06F 17/30592 |
| 7,516,149 B2 * | 4/2009 | Motwani | ............ | G06F 17/30303 |
| 8,046,362 B2 * | 10/2011 | Bayliss | ............ | G06F 17/30303 |
| | | | | 707/737 |
| 8,316,047 B2 * | 11/2012 | Bayliss | ............ | G06F 17/30303 |
| | | | | 707/780 |

(Continued)

OTHER PUBLICATIONS

Techopedia. "What Is a Primary Key?—Definition from Techopedia." Techopedia.com. 2011. Accessed Mar. 18, 2017 from <https://www.techopedia.com/definition/5547/primary-key>. Archived copy accessed from <http://web.archive.org/web/20110930101925/http://www.techopedia.com/definition/5547/primary-key>.*

(Continued)

*Primary Examiner* — Robert W Beausoliel, Jr.
*Assistant Examiner* — Arthur Ganger
(74) *Attorney, Agent, or Firm* — Jason H. Sosa; David S. Richart; Arnold B. Bangali (57) ABSTRACT

A method, executed by a computer, for de-duplicating data includes receiving a dataset, pivoting the dataset along a set of columns that have a common domain to provide a pivoted dataset, de-duplicating the pivoted dataset to provide a de-duplicated dataset, and using the de-duplicated dataset. De-duplicating the pivoted dataset may include computing similarity scores for records that have different primary keys and merging records that have a similarity score that exceeds a selected threshold value. The method may include determining the set of columns having a common domain by referencing a business catalog and/or conducting a data classification operation on some or all of the columns of the dataset. The method may also include pivoting the dataset along another set of columns that have a different common domain. A computer system and computer program product corresponding to the method are also disclosed herein.

9 Claims, 6 Drawing Sheets

(56) References Cited

U.S. PATENT DOCUMENTS

| | | | | |
|---|---|---|---|---|
| 8,544,727 | B1* | 10/2013 | Quinn | G06Q 40/00 235/379 |
| 8,560,506 | B2 | 10/2013 | Chaturvedi et al. | |
| 8,666,996 | B2 | 3/2014 | Kondasani | |
| 8,914,316 | B2* | 12/2014 | Tengli | G06F 17/30495 706/45 |
| 8,943,062 | B2* | 1/2015 | Baumgartner | G06F 17/30598 455/454 |
| 9,317,544 | B2* | 4/2016 | Ganjam | G06F 17/30533 |
| 9,547,664 | B2* | 1/2017 | Zinar | G06F 17/30156 |
| 2004/0107203 | A1* | 6/2004 | Burdick | G06F 17/30371 |
| 2004/0260694 | A1* | 12/2004 | Chaudhuri | G06F 17/30542 |
| 2010/0005048 | A1 | 1/2010 | Bodapati et al. | |
| 2012/0059827 | A1 | 3/2012 | Brittain et al. | |
| 2012/0066214 | A1* | 3/2012 | Nelke | G06F 17/10 707/723 |
| 2013/0297568 | A1 | 11/2013 | Gruenwald | |
| 2014/0074801 | A1 | 3/2014 | Kacher et al. | |
| 2014/0279757 | A1* | 9/2014 | Shimanovsky | G06Q 30/0282 706/12 |
| 2014/0337331 | A1* | 11/2014 | Hassanzadeh | G06F 17/30578 707/726 |
| 2016/0154779 | A1* | 6/2016 | Fourny | G06F 17/246 707/600 |
| 2016/0224920 | A1* | 8/2016 | Doms | G06Q 10/06393 |

OTHER PUBLICATIONS

Detecting outliers: Do not use standard deviation around the mean, use absolute deviation around the median. Christophe Leys et al. Journal of Experimental Social Psychology, vol. 49, Issue 4, 2013, pp. 764-766, ISSN 0022-1031 (http://www.sciencedirect.com/science/article/pii/S0022103113000668) Accessed Sep. 14, 2017.*

"Using the Median Absolute Deviation to Find Outliers" Peter Rosenmai. Eureka Statistics, published Nov. 25, 2013. Accessed Sep. 14, 2017 from <https://eurekastatistics.com/using-the-median-absolute-deviation-to-find-outliers/>.*

Oracle. "Enterprise Manager Cloud Control Administrator's Guide." Advanced Threshold Management, 2014, accessed Mar. 3, 2016 from <https://web.archive.org/web/20141012210442/https://docs.oracle.com/cd/E24628_01/doc.121/e24473/adv_threshold.htm> (Year: 2014).*

Hellerstein, Joseph M. "Quantitative Data Cleaning for Large Databases." Feb. 27, 2008, Accessed Mar. 3, 2018 from <db.cs.berkeley.edu/jmh/papers/cleaning-unece.pdf> (Year: 2008).*

Kopp, Michael. "Why Averages Suck and Percentiles Are Great." Dynatrace News, Dynatrace, Nov. 14, 2012, Accessed Mar. 3, 2018 from <www.dynatrace.com/news/blog/why-averages-suck-and-percentiles-are-great/> (Year: 2012).*

Cunningham, C, et al. "PIVOT and UNPIVOTOptimization and Execution Strategies in an RDBMS." Proceedings 2004 VLDB Conference, 2004, pp. 998-1009., doi:10.1016/b978-012088469-8/50087-5. Accessed Jun. 13, 2018 from <https://pdfs.semanticscholar.org/13c3/836f6f031c6bc321c4244fc42cad168939e3.pdf> (Year: 2004).*

Christen, Peter, "A Survey of Indexing Techniques for Scalable Record Linkage and Deduplication", IEEE Transactions on Knowledge and Data Engineering, vol. 24, No. 9, Sep. 2012, pp. 1537-1555, © 2012 IEEE, <http://ieeexplore.ieee.org/xpl/articleDetails.jsp?tp=&arnumber=5887335&searchWithin%3DDeduplication%26queryText%3DDuplicate+Records>.

Grondin, Richard, "Columnar Deduplication and Column Tokenization: Improving Database Performance, Security and Interoperability", Posted on Apr. 23, 2013, Informatica, Perspectives, The Informatica Blog, <http://blogs.informatica.com/perspectives/2013/04/23/columnar-deduplication-and-column-tokenization-improving-database-performance-security-and-interoperability/>.

Su, et al., "Record Matching over Query Results from Multiple Web Databases", IEEE Xplore Digital Library, vol. 22, Issue 4, ISSN 1041-4347, pp. 578-589, <http://ieeexplore.ieee.org/xpl/articleDetails.jsp?tp=arnumber=4840347&searchWithin%3DSame-source+Duplicates%26sortType%3Ddesc_p_Publication_Year%26queryTExt%3DDuplicate+Records>.

"Data De-Duplication", U.S. Appl. No. 14/716,910, filed May 20, 2015, pp. 1-26.

IBM Appendix P, list of IBM patents or patent applications treated as related, May 20, 2015, pp. 1-2.

* cited by examiner

| Name | email1 | email2 | Phone1 | Phone2 | Phone3 | Zip |
|---|---|---|---|---|---|---|
| NameA | AddrA | AddrB | PhoneA | PhoneB | PhoneC | ZipA |
| NameA | AddrB | | PhoneC | PhoneA | | ZipA |
| NameA | AddrB | AddrA | PhoneC | | | ZipA |
| NameB | AddrX | | PhoneX | PhoneY | | ZipX |
| NameB | AddrY | AddrX | PhoneZ | PhoneX | PhoneY | ZipY |

Fig. 4a

| PK | Name | email1 | email2 | Phone1 | Phone2 | Phone3 | Zip |
|---|---|---|---|---|---|---|---|
| 1 | NameA | AddrA | AddrB | PhoneA | PhoneB | PhoneC | ZipA |
| 2 | NameA | AddrB | | PhoneC | PhoneA | | ZipA |
| 3 | NameA | AddrB | AddrA | PhoneC | | | ZipA |
| 4 | NameB | AddrX | | PhoneX | PhoneY | | ZipX |
| 5 | NameB | AddrY | AddrX | PhoneZ | PhoneX | PhoneY | ZipY |

Fig. 4b

| PK | Name | email | Phone1 | Phone2 | Phone3 | Zip |
|---|---|---|---|---|---|---|
| 1 | NameA | AddrA | PhoneA | PhoneB | PhoneC | ZipA |
| 1 | NameA | AddrB | PhoneA | PhoneB | PhoneC | ZipA |
| 2 | NameA | AddrB | PhoneC | PhoneA | | ZipA |
| 3 | NameA | AddrB | PhoneC | | | ZipA |
| 3 | NameA | AddrA | PhoneC | | | ZipA |
| 4 | NameB | AddrX | PhoneX | PhoneY | | ZipX |
| 5 | NameB | AddrY | PhoneZ | PhoneX | PhoneY | ZipY |
| 5 | NameB | AddrX | PhoneZ | PhoneX | PhoneY | ZipY |

Fig. 4c

| PK | Name | email | Phone | Zip |
|---|---|---|---|---|
| 1 | NameA | AddrA | PhoneA | ZipA |
| 1 | NameA | AddrA | PhoneB | ZipA |
| 1 | NameA | AddrA | PhoneC | ZipA |
| 1 | NameA | AddrB | PhoneA | ZipA |
| 1 | NameA | AddrB | PhoneB | ZipA |
| 1 | NameA | AddrB | PhoneC | ZipA |
| 2 | NameA | AddrB | PhoneC | ZipA |
| 2 | NameA | AddrB | PhoneA | ZipA |
| 3 | NameA | AddrB | PhoneC | ZipA |
| 3 | NameA | AddrA | PhoneC | ZipA |
| 4 | NameB | AddrX | PhoneX | ZipX |
| 4 | NameB | AddrX | PhoneY | ZipX |
| 5 | NameB | AddrY | PhoneZ | ZipY |
| 5 | NameB | AddrY | PhoneX | ZipY |
| 5 | NameB | AddrY | PhoneY | ZipY |
| 5 | NameB | AddrX | PhoneZ | ZipY |
| 5 | NameB | AddrX | PhoneX | ZipY |
| 5 | NameB | AddrX | PhoneY | ZipY |

Fig. 4d

| PK | Name | email1 | email2 | Phone1 | Phone2 | Phone3 | Zip1 | Zip2 |
|---|---|---|---|---|---|---|---|---|
| 1 | NameA | AddrA | AddrB | PhoneA | PhoneB | PhoneC | ZipA | |
| 4 | NameB | AddrX | AddrY | PhoneX | PhoneY | PhoneZ | ZipX | ZipY |

DATA DE-DUPLICATION

BACKGROUND OF THE INVENTION

The present invention relates generally to the field of data processing, and more particularly to data de-duplication.

Data de-duplication is an important operation when cleansing a data source. Data de-duplication is typically achieved by searching in a database for duplicated records that represent the same entity and merging records so that a single record remains for the entity. In searching for duplicate records, de-duplication techniques typically distribute the records into multiple groups in a way that similar records may fall into the same group, conduct a column by column comparison of two selected records within the same group, and compute a match score indicating the probability or likelihood that the selected records represent the same entity. Record pairs that have a sufficiently high score are considered duplicates and may be merged to create a single 'golden' record.

SUMMARY

As disclosed herein, a method, executed by a computer, for de-duplicating data includes receiving a dataset, pivoting the dataset along a set of columns that have a common domain to provide a pivoted dataset, de-duplicating the pivoted dataset to provide a de-duplicated dataset, and using the de-duplicated dataset. De-duplicating the pivoted dataset may include computing similarity scores for records that have different primary keys and merging records with a similarity score that exceeds a selected value. The method may include determining the set of columns having a common domain by referencing a business catalog and/or conducting a data classification operation on some or all of the columns of the dataset. The method may also include pivoting the dataset additional sets of columns that have additional common domains. The method provides improved data de-duplication. A computer system and computer program product corresponding to the method are also disclosed herein.

DETAILED DESCRIPTION

Applicants have observed that currently available data de-duplication techniques work well as long as each column in a dataset has a unique domain which is the same for all of the records. However, currently available techniques do not respond well to having similar information in multiple columns of the compared records. For example, some data sources may have multiple fields for email addresses and phone numbers. Unless the placement of the data in those fields is the same in every instance, currently available techniques are unable to consistently identify and de-duplicate records that represent the same entity.

The embodiments disclosed herein were developed in response to the observations of the Applicants and improve the de-duplication of datasets that have multiple fields with a common domain.

Figure 1:
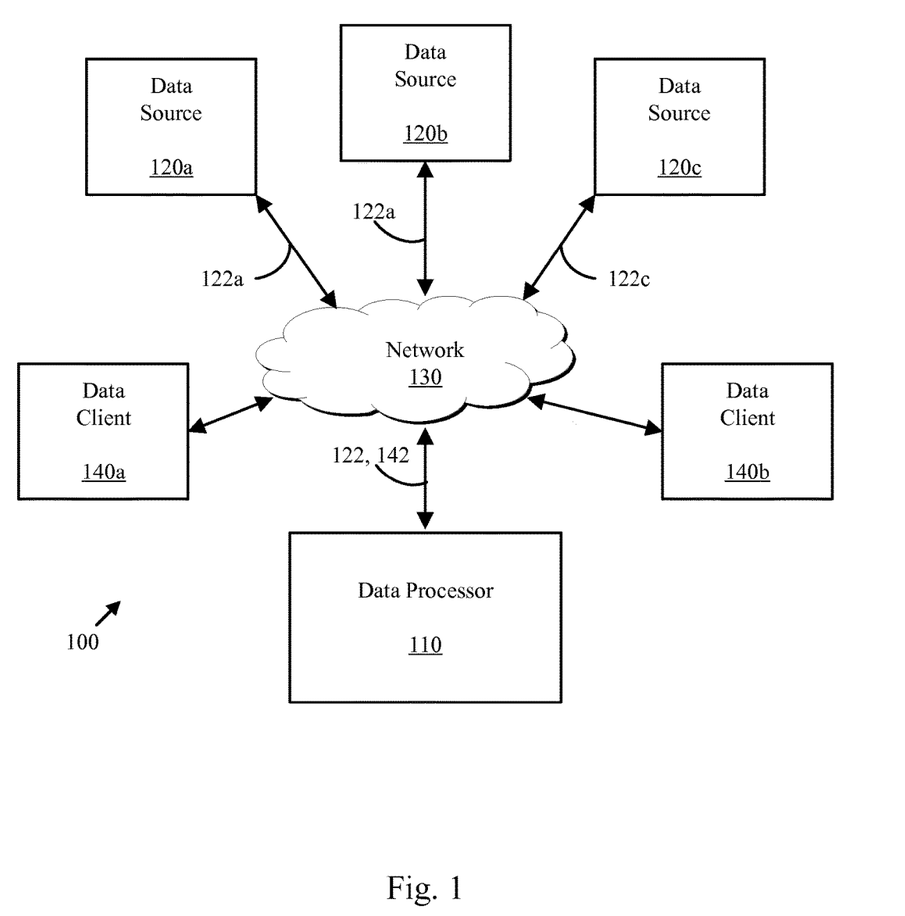
FIG. 1 is a functional block diagram of one embodiment of a data processing environment in which at least some of the embodiments disclosed herein may be deployed.

FIG. 1 is a functional block diagram of one embodiment of a data processing environment 100. As depicted, the data processing environment 100 includes a data processor 110, one or more data sources 120 (e.g., data sources 120a, 120b, and 120c), a network 130, and one or more data clients 140 (e.g., data clients 140a and 140b). The data processing environment 100 is one example of an environment in which at least some of the embodiments disclosed herein may be deployed.

The data processor 110 processes datasets provided by, or retrieved from, the data sources 120. The data sources 120 may be accessible to the data processor 110 via the network 130. One or more data clients 140 may also be connected to the data processor 110 via the network 130. In some embodiments the data sources 120 are also data clients 140.

Data 122, provided by the data sources 120, may be disparate data that does not facilitate direct comparisons. For example, the data records that comprise the data 122 may not have the same number of columns or may have different or unknown data in one or more columns. Some of the data 122 may have one or more business catalogs (i.e., metadata) associated therewith (not shown in the drawings) that generally describe the content of each column of data, while other data 122 may not have business catalogs associated therewith.

In contrast to the data sources 120, the data clients 140 have a need for consistent data that is readily comparable. As will be described hereinafter, and despite the foregoing issues, the data processor 110 is configured to compare and process the data 122 and provide consistent data 142.

Figure 5:
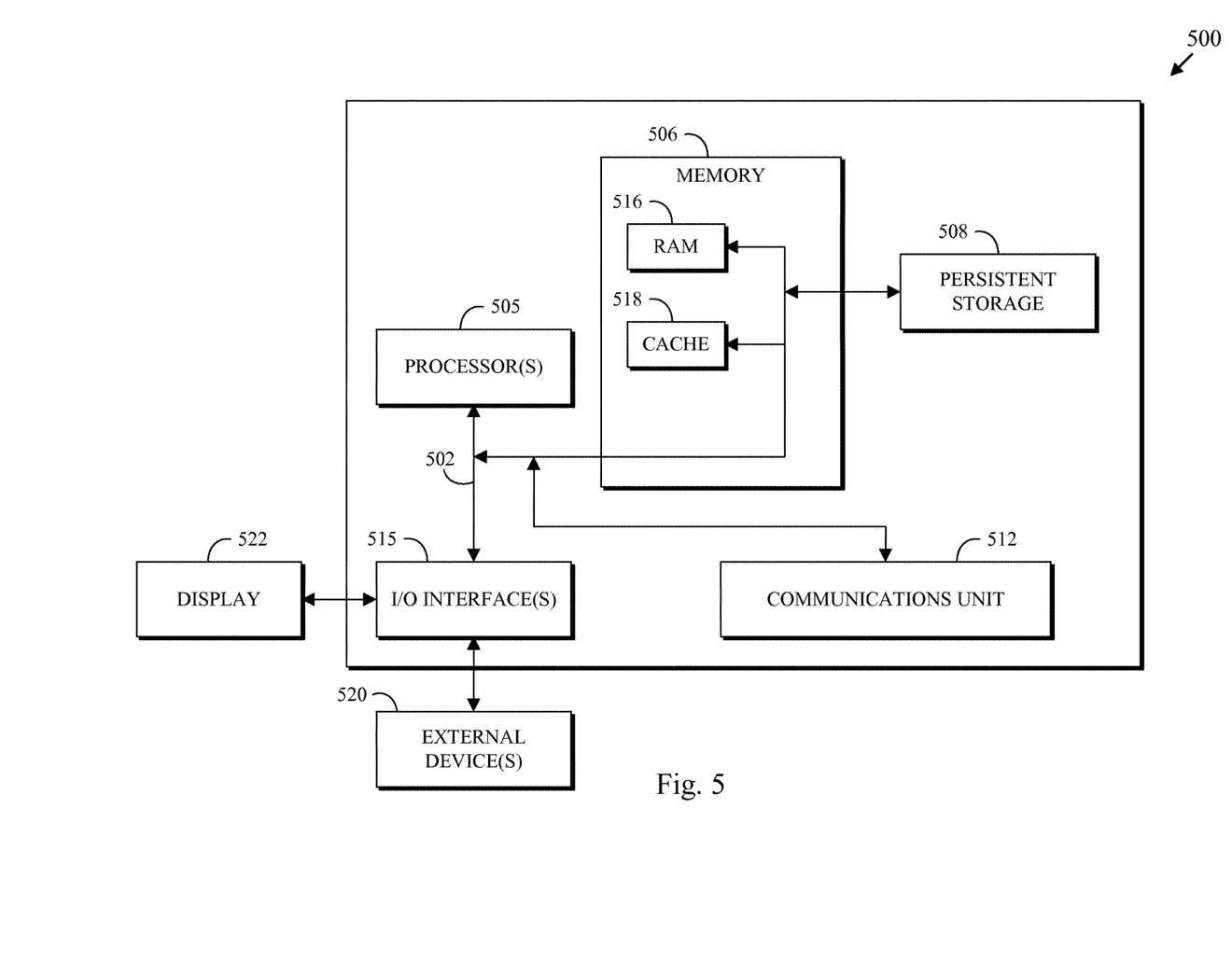
FIG. 5 is a block diagram depicting one example of a computing apparatus (i.e., computer) suitable for executing the methods disclosed herein.

It should be noted that the data processor 110 may include internal and external hardware components, as depicted and described in further detail with respect to FIG. 5. Furthermore, the network 130 can be any combination of connections and protocols that will support communications between the data processor 110, the data sources 120, and the data clients (i.e., data consumers) 140. For example, the network 130 can be a local area network (LAN), a wide area network (WAN) such as the Internet, or a combination of the two, and can include wired, wireless, or fiber optic connections.

Figure 2:
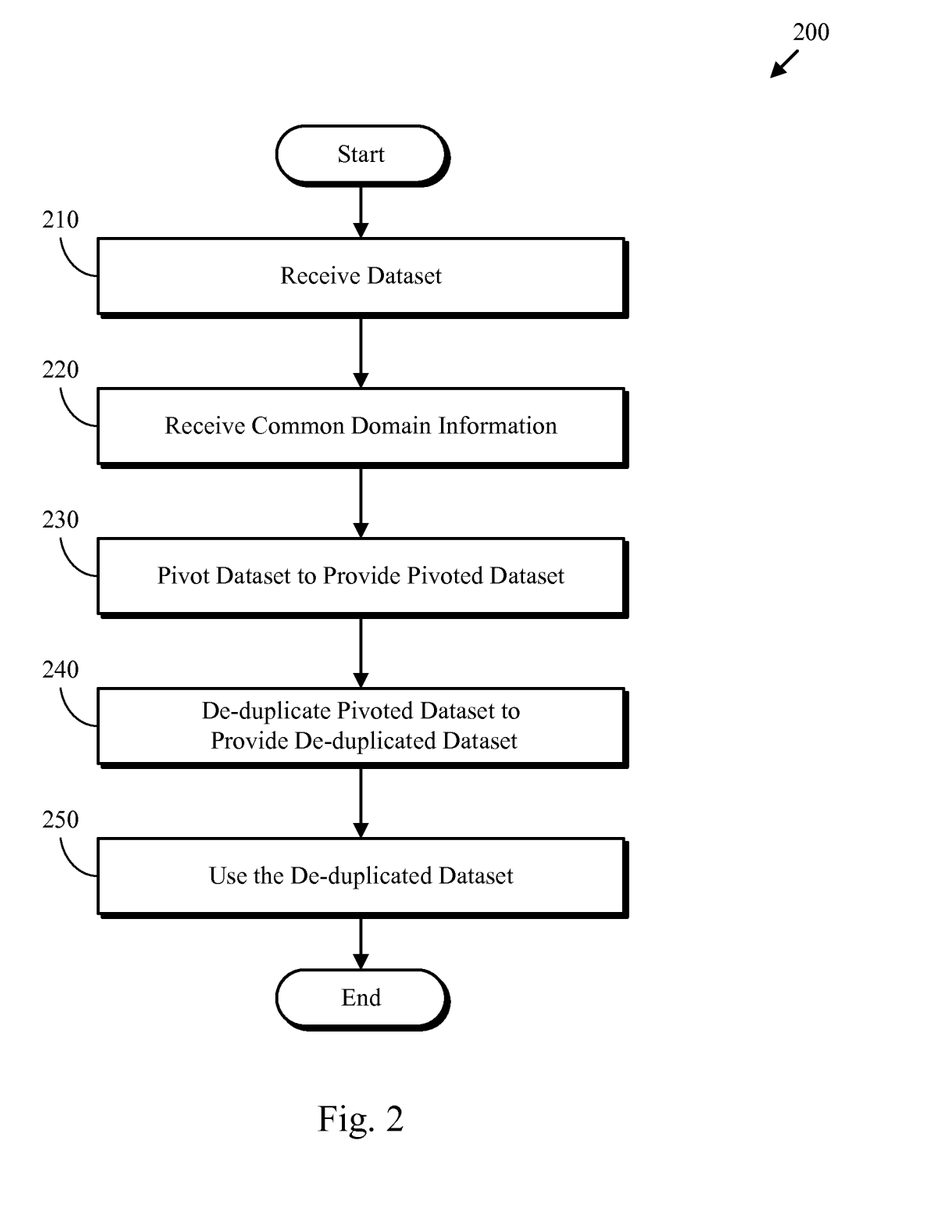
FIG. 2 is a flowchart depicting one embodiment of a dataset processing method.

FIG. 2 is a flowchart depicting one embodiment of a dataset processing method 200. As depicted, the dataset processing method 200 includes receiving (210) a dataset, receiving (220) common domain information, pivoting (230) the dataset, de-duplicating (240) the pivoted dataset, and using (250) the de-duplicated dataset. The dataset processing method 200 may be used (e.g., by the data processor 110) to process and improve datasets that potentially have similar information in multiples columns, as is commonly found in datasets collected from disparate sources.

Receiving (210) a dataset may include receiving data records from one or more sources. Some of the fields of the dataset may have missing entries (i.e., null values). In certain embodiments, data from disparate sources is merged into a record format that is a superset of the disparate dataset formats. Receiving (210) the dataset may also include determining if the dataset does not include a primary key field (i.e., column) and auto-generating a primary key value for each record.

Receiving (220) common domain information may include receiving information specifying which columns in the dataset (e.g., a superset from disparate sources) have a common domain. The common domain information may include one or more domain types and a listing of the columns (i.e., a set of columns) that conform to each type. In some embodiments, the common domain information is extracted from a business catalog or other source of pre-identified column domain information. In other embodiments, the domains for the columns are identified by data processing techniques. For example, the domains for data columns may be determined according to the embodiments disclosed in commonly assigned U.S. Pat. No. 8,666,998 entitled "Handling data sets," which is incorporated herein by reference. Alternately, columns of data may be compared for similarity of their names and/or formatting of their data in order to determine common domains. For example, phone numbers within distinct columns may have common prefixes and/or similar formatting that could be identified via a similarity test and/or a data parsing operation, or the columns containing those phone numbers may have similar names (e.g., that differ with only a suffix), indicating that the columns contain information of same domain.

Pivoting (230) the dataset may include conducting pivoting operations on each set of columns with a common domain. The pivoting operations may result in the conversion of a set of data columns within each record that have a common domain to a set of data rows (i.e., multiple data records) that have a single column for the common domain. For example, pivoting operations conducted on a data record with a set of n columns that have a common domain may result in a set of n records (i.e., rows) with a single column for the common domain. In some embodiments, multiple pivoting operations corresponding to multiple sets of columns with a common domain (for each set) are conducted. Multiple pivoting operations may result in many pivoted data records being generated from each record in the dataset. See FIGS. 4a to 4d for a specific example that shows two pivoting operations for each data record.

De-duplicating (240) the pivoted dataset may include discarding duplicate records or merging records that have duplicated information to provide a de-duplicated dataset. Discarding duplicate records or merging records that have duplicated information may result in multiple pivoted records being replaced by a single data record. In some embodiments, de-duplication is achieved by an un-pivoting operation for records with a common primary key and discarding duplicate records that have a different primary key. Consequently, pivoted records generated from multiple records in the original dataset may be replaced with a single data record resulting in de-duplication that is responsive to having similar data within different columns.

Using (250) the de-duplicated dataset may include additional processing including conventional data processing operations (e.g., map/reduce operations, ETL (Extract Transform Load) operations, MDM (Master Data Management) operations, reporting operations, and the like).

One of skill in the art will appreciate the simplicity of the method 200. In one embodiment, before actual de-duplication of the records is conducted, columns having the same data class/domain are detected using either information stored in a business catalog (e.g., attached business terms for instance) or using a data classification algorithm (e.g., as disclosed in commonly assigned U.S. Pat. No. 8,666,998 entitled "Handling data sets," which is incorporated herein by reference). If multiple columns belonging to the same domain are found, a primary key is generated for each row (if needed), the columns of each domain are pivoted in one single column/multiple rows, and a de-duplication process is conducted on the transformed dataset.

Figure 3:
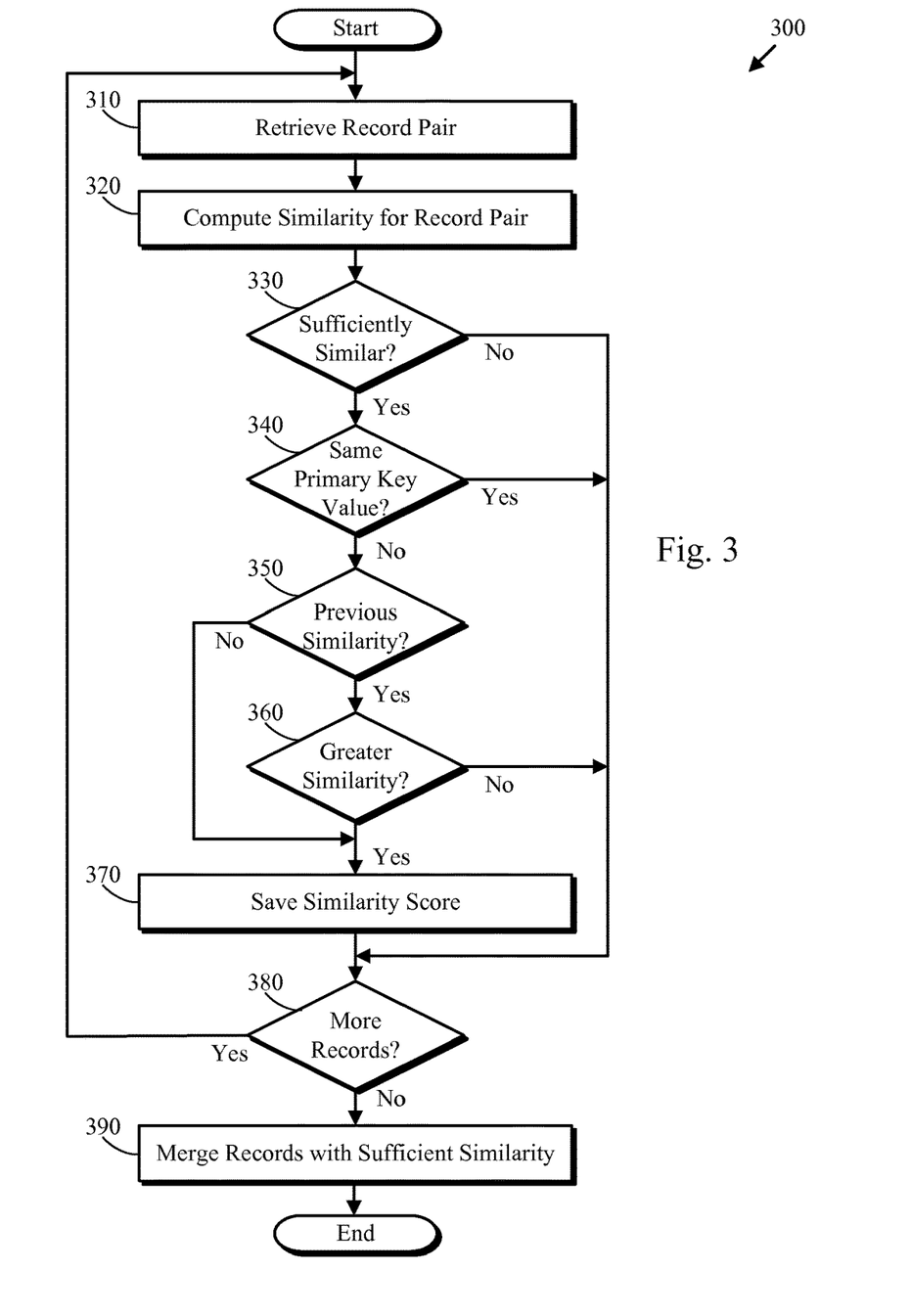
FIG. 3 is a flowchart depicting one embodiment of a record de-duplication method.

FIG. 3 is a flowchart depicting one embodiment of a record de-duplication method 300. As depicted, the record de-duplication method 300 includes retrieving (310) a pair of data records, computing (320) a similarity for the record pair, determining (330) whether the records are sufficiently similar, determining (340) whether the records have the same primary key value, determining (350) whether a previous similarity score exists for other records having the same pair of primary key values, determining (360) whether the new similarity score is greater, saving (370) the similarity score, determining (380) whether additional records need to be processed, and merging (390) records with sufficient similarity. The record de-duplication method 300 is one example of the de-duplicating operation 240 shown in FIG. 2 and generally described above.

Retrieving (310) a pair of data records may include reading a new data record (e.g., row) from a dataset and maintaining a record that was previously retrieved. Initially, a pair of data records may be retrieved in preparation of the comparing operation 320.

Computing (320) a similarity for the record pair may include computing a score based on the similarity of individual columns. For example, the similarity score can be computed by assigning a weight to each column that increases the score when two records have the same value for the same column and/or by assigning a cost to each column that decreases the score when two records have different values for the same column. In some embodiments, advanced comparison functions like the Levenshtein distance (edit-distance) are calculated instead of doing a strict value comparison, in order to at least partially increase the score if the values for a column are nearly the same but not exactly the same. Columns that are the result of pivoting operations may, or may not be, factored into the similarity score.

Determining (330) whether the records are sufficiently similar may include comparing a similarity score generated by the comparing operation 320 with a selected threshold value. In some embodiments, the selected threshold value is determined by analyzing a histogram of similarity scores. For example, in one embodiment a similarity value that is between a median similarity score and a maximum similarity score may be used as the selected threshold value. In another embodiment, a testing dataset with pre-identified duplicates is used to select a threshold value for the similarity score.

Determining (340) whether the records have the same primary key value may include checking whether the primary key values are identical. If the primary keys are identical, the method ignores that the records are potential duplicates and skips to determining (380) whether additional records need to be processed. If the primary keys are different, the method continues by determining (350) whether a previous similarity score exists.

Determining (350) whether a previous similarity score exists may include accessing a table of similarity scores for pairs of primary keys and determining whether an entry exists for the primary key pair corresponding to the compared records. If a previous similarity score does not exist, the method advances to determining (360) whether the new similarity score is greater than the previous similarity score. If the new similarity score is greater, the method continues by saving (370) the similarity score and determining (380) whether additional records need to be processed.

Determining (380) whether additional records need to be processed may include testing a current row index against one or more values or some other procedure well known to those of skill in the art. If additional records need to be processed, the depicted method 300 loops to the retrieving operation 310 and continues processing. Otherwise the method advances to the merging operation 390.

Merging (390) records with sufficient similarity may include combining records to include all of the information available in the duplicate records which (in some instances) may result in more columns than the original received dataset. In one embodiment, records are merged by conducting a de-pivoting operation on a pivoted column and the resulting columns are identical to those in the original received dataset. Subsequent to merging, the method terminates or is suspended until additional records need to be processed.

Figure 4A:
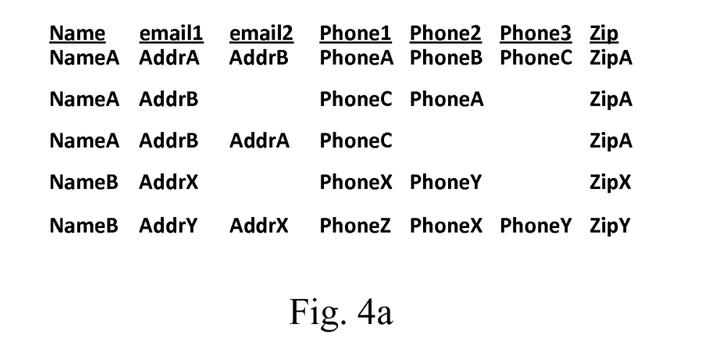
FIGS. 4a to 4e are text diagrams depicting an example dataset at various stages of processing.

FIGS. 4a to 4e are text diagrams depicting an example of a sample dataset at various stages of processing. FIG. 4a shows a sample received dataset consisting of 5 records with a name column, two email address columns, three phone number columns, and a zip-code (postal code) column. As depicted, some of the fields may be empty.

Figure 4B:
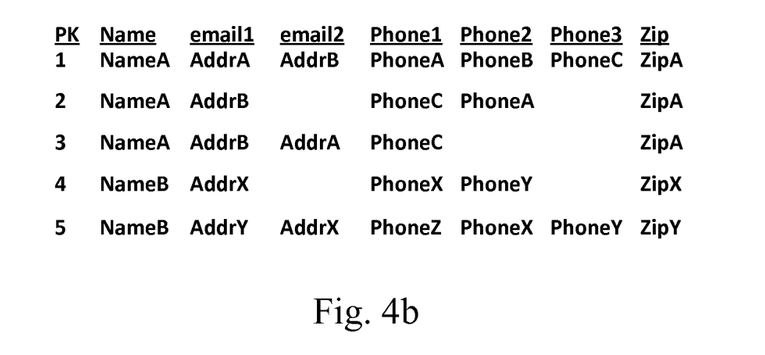
Figure 4C:
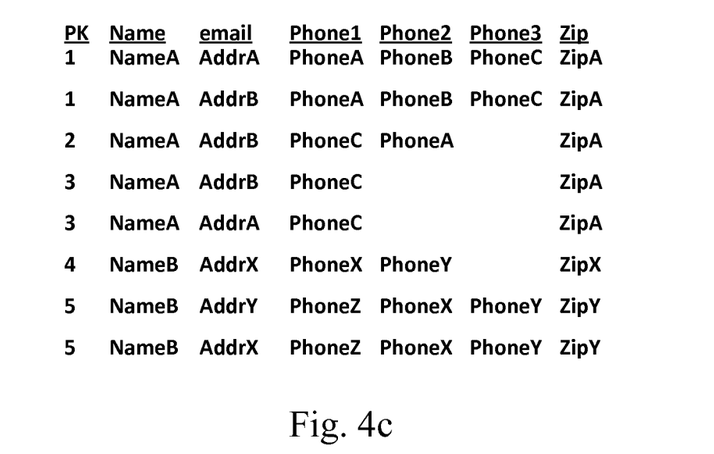
Figure 4D:
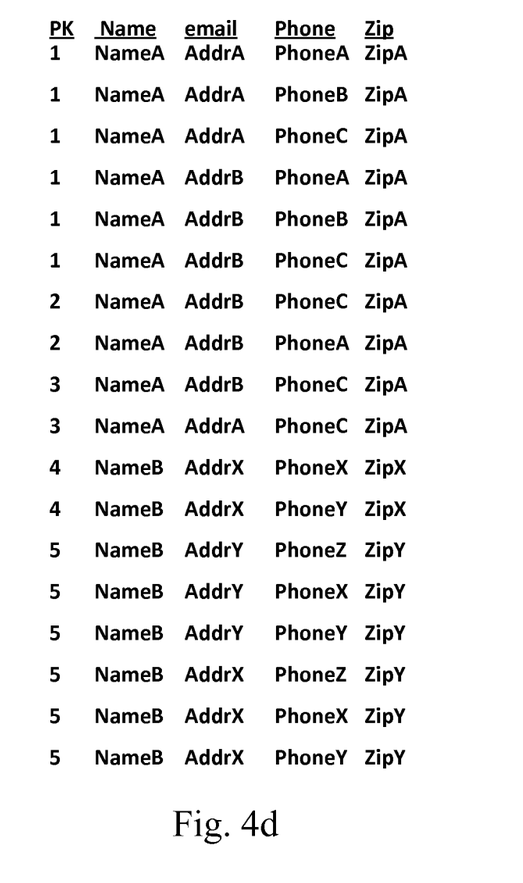

FIG. 4b shows that a primary key field may be auto-generated and included in each record. Subsequently, due to a pivoting operation on the two email columns, FIG. 4c shows that some of the records are replicated and provided with different values for a single email column resulting in 8 records rather than 5. Similarly, due to a pivoting operation on the three email columns, FIG. 4d shows that many of the records are replicated and provided with different values for a single phone column resulting in 18 records rather than 8.

Figure 4E:
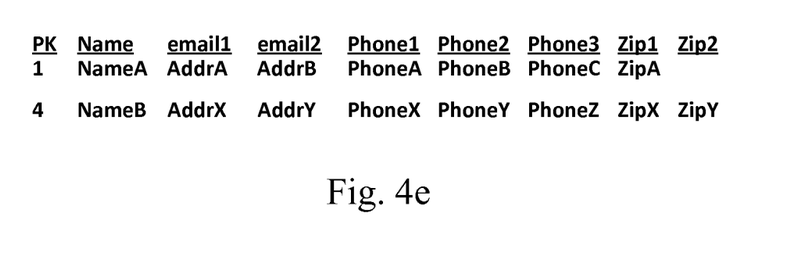

Although it may appear that the pivoting operations simply increase the amount of data, FIG. 4e shows that duplicates are eliminated by the methods disclosed herein resulting in just two records. Depending on how the de-duplication operations (e.g., operations 350 and 360) are conducted, the resulting records may or may not have the same columns as the original received dataset. For example, the records shown in FIG. 4e have a primary key field and a second zip-code field that were not present in the original dataset.

FIG. 5 is a block diagram depicting components of a computer 500 suitable for executing the methods disclosed herein. The computer 500 may be one embodiment of the data processor 110 depicted in FIG. 1. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for de-duplicating data, the computer program product comprising:
   one or more computer readable storage media and program instructions stored on the one or more computer readable storage media, the program instructions comprising instructions to:
   receive a dataset in the form of a database data structure organized with rows respectively corresponding to records and columns respectively corresponding to field values for the records;
   receive common domain information for the dataset, wherein the common domain information defines a set of columns having a common domain;
   in response to determining that the dataset does not have a primary key field, generate a primary key for each row in the dataset;
   pivot the dataset along the set of columns having a common domain to provide a pivoted dataset having multiple rows for the set of columns and a single column for the common domain;
   compute similarity scores for records of the dataset, wherein the similarity scores are based on similar data existing within different columns of records of the dataset;

determine a median similarity score and a maximum similarity score of the similarity scores;

determine a threshold value that is between the median similarity score and the maximum similarity score; and merge records that have a similarity score that exceeds the threshold value to obtain a de-duplicated database data structure having no duplicate records, wherein the records are merged by de-pivoting the dataset for rows having a common primary key and discarding duplicate rows that have a different primary key.

2. The computer program product of claim 1, wherein the instructions to compute similarity scores for records of the dataset comprise instructions to compute similarity scores for records that have different primary keys.

3. The computer program product of claim 1, wherein the program instructions further comprise instructions to determine the set of columns having a common domain.

4. The computer program product of claim 3, wherein the instructions to determine the set of columns having a common domain comprise instructions to conduct a data classification operation on a plurality of columns of the dataset.

5. The computer program product of claim 3, wherein the instructions to determine the set of columns having a common domain comprise instructions to reference a business catalog.

6. The computer program product of claim 1, wherein the program instructions further comprise instructions to pivot the dataset along another set of columns having a common domain.

7. A computer system for de-duplicating data, the computer system comprising:

one or more computer processors;

one or more computer readable storage media;

program instructions stored on the computer readable storage media for execution by at least one of the computer processors, the program instructions comprising instructions to:

receive a dataset in the form of a database data structure organized with rows respectively corresponding to records and columns respectively corresponding to field values for the records;

receive common domain information for the dataset, wherein the common domain information defines a set of columns having a common domain;

in response to determining that the dataset does not have a primary key field, generate a primary key for each row in the dataset;

pivot the dataset along the set of columns having a common domain to provide a pivoted dataset having multiple rows for the set of columns and a single column for the common domain;

compute similarity scores for records of the dataset, wherein the similarity scores are based on similar data existing within different columns of records of the dataset;

determine a median similarity score and a maximum similarity score of the similarity scores;

determine a threshold value that is between the median similarity score and the maximum similarity score; and merge records that have a similarity score that exceeds the threshold value to obtain a de-duplicated database data structure having no duplicate records, wherein the records are merged by de-pivoting the dataset for rows having a common primary key and discarding duplicate rows that have a different primary key.

8. The computer system of claim 7, wherein the instructions to compute similarity scores for records of the dataset comprise instructions to compute similarity scores for records that have different primary keys.

9. The computer system of claim 7, wherein the program instructions further comprise instructions to determine the set of columns having a common domain.

* * * * *